US009483128B2

(12) United States Patent
Nagano

(10) Patent No.: US 9,483,128 B2
(45) Date of Patent: Nov. 1, 2016

(54) DISPLAY CONTROL DEVICE AND DISPLAY CONTROL METHOD

(71) Applicant: Hiroyuki Nagano, Tokyo (JP)

(72) Inventor: Hiroyuki Nagano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/525,311

(22) Filed: Oct. 28, 2014

(65) Prior Publication Data
US 2015/0138168 A1 May 21, 2015

(30) Foreign Application Priority Data

Nov. 21, 2013 (JP) ................................. 2013-240953

(51) Int. Cl.
*G06F 3/0354* (2013.01)
*G06F 3/038* (2013.01)
*G06F 3/0488* (2013.01)

(52) U.S. Cl.
CPC ......... *G06F 3/03545* (2013.01); *G06F 3/0383* (2013.01); *G06F 3/04883* (2013.01); *G06F 2203/0384* (2013.01)

(58) Field of Classification Search
CPC .................. G06F 2203/0384; G06F 3/03545; G06F 3/0383; G06F 3/04883; G06F 3/14
USPC ........................ 345/156, 158, 179, 170–176; 401/16–17
See application file for complete search history.

(56) References Cited

U.S. PATENT DOCUMENTS

| | | | | | |
|---|---|---|---|---|---|
| 5,341,503 | A | * | 8/1994 | Gladstein | .................. G06F 1/28 320/136 |
| 5,478,976 | A | * | 12/1995 | Kano | ...................... G06F 21/35 178/18.01 |
| 5,501,535 | A | * | 3/1996 | Hastings | ................. G01P 13/00 347/109 |

(Continued)

FOREIGN PATENT DOCUMENTS

JP 4001758 10/2007

*Primary Examiner* — Quan-Zhen Wang
*Assistant Examiner* — Tony Davis
(74) *Attorney, Agent, or Firm* — IPUSA, PLLC

(57) ABSTRACT

A display control device includes a display part, an indication part to indicate a position on the display part and output a value of residual electric energy thereof, a coordinate detection part to detect coordinates of the position on the display part, a rendering data production part to produce rendering data based on the coordinates of the position on the display part, a determination part to determine whether or not the value of residual electric energy is less than a threshold value, a rendering data processing part to process the rendering data to produce data for notification of electric energy reduction in a case where the determination part determines that the value of residual electric energy is less than the threshold value, and a display control part to display the rendering data and the data for notification of electric energy reduction on the display part.

13 Claims, 6 Drawing Sheets

(56) References Cited

U.S. PATENT DOCUMENTS

| | | | | |
|---|---|---|---|---|
| 5,809,310 A * | 9/1998 | Fukuda | | G06F 1/28 320/149 |
| 5,883,338 A * | 3/1999 | Trunck | | G06F 3/03545 178/19.01 |
| 6,101,611 A * | 8/2000 | Yoshida | | G06F 1/26 320/132 |
| 6,454,482 B1 * | 9/2002 | Silverbrook | | B41J 2/17503 346/140.1 |
| 6,536,972 B2 * | 3/2003 | Bramlett | | B43K 27/00 347/109 |
| 6,622,733 B2 * | 9/2003 | Saksa | | A45D 34/04 132/200 |
| 6,749,355 B2 * | 6/2004 | Payne | | B41J 3/36 347/109 |
| 6,933,933 B2 * | 8/2005 | Fleming | | G06F 3/0383 178/18.01 |
| 7,116,225 B2 * | 10/2006 | Lai | | G06F 21/83 340/568.1 |
| 7,705,837 B2 * | 4/2010 | Locker | | G06F 3/041 178/18.01 |
| 7,715,065 B2 | 5/2010 | Nishimura et al. | | |
| 7,760,191 B2 * | 7/2010 | Cohen | | G06K 9/00402 345/156 |
| 8,154,577 B2 | 4/2012 | Tanaka et al. | | |
| 8,362,910 B2 * | 1/2013 | Lee | | G06F 1/30 340/636.1 |
| 8,427,704 B2 | 4/2013 | Tanaka et al. | | |
| 8,856,948 B1 * | 10/2014 | Robison | | G06F 21/60 726/26 |
| 8,872,805 B2 * | 10/2014 | Matsumoto | | G06F 3/03545 345/156 |
| 2002/0136587 A1 * | 9/2002 | Bramlett | | B43K 27/00 401/17 |
| 2006/0112196 A1 * | 5/2006 | Chang | | G06F 3/038 710/14 |
| 2007/0134561 A1 * | 6/2007 | Butterfield | | G03F 1/144 430/5 |
| 2010/0080018 A1 * | 4/2010 | Overes | | G02B 6/0068 362/583 |
| 2010/0277327 A1 * | 11/2010 | Lee | | G06F 1/30 340/636.16 |
| 2011/0234549 A1 * | 9/2011 | Matsumoto | | G06F 3/03545 345/179 |
| 2012/0044542 A1 | 2/2012 | Nagano | | |
| 2012/0162061 A1 * | 6/2012 | Hildebrandt | | G06F 3/03545 345/156 |
| 2015/0138160 A1 * | 5/2015 | Bohn | | G01B 11/002 345/175 |

* cited by examiner

DISPLAY CONTROL DEVICE AND DISPLAY CONTROL METHOD

BACKGROUND OF THE INVENTION

1. Field of the Invention

An aspect of the present invention relates to at least one of a display control device and a display control method.

2. Description of the Related Art

An electronic blackboard device that is a computerized whiteboard has conventionally been utilized as a display control device in a meeting or a lesson, and a technique has been known such that a user uses an electronic pen on a display screen and rendering data drawn by the electronic pen are displayed on the display screen like writing on a blackboard (for example, see Japanese Patent No. 4001758).

However, an electronic pen that is used for rendering onto a display screen of an electronic blackboard device is usually configured to transmit an infrared ray (or an ultrasonic wave) signal or the like by a battery such as an electrical cell, so that it is not possible for the electronic blackboard device to detect a signal from the electronic pen in a case where an electric energy is consumed. Therefore, it is possible to consider a method for displaying reduction of a residual electric energy value on a display screen by an icon or displaying a message for encouraging replacement or electrical charging of an electrical cell or the like in a case where an electric energy is reduced.

However, there is a problem that a handwriting area is reduced in a case where a display for reduction of an electric energy as described above is provided on a display screen.

SUMMARY OF THE INVENTION

According to one aspect of the present invention, there is provided a display control device, including a display part, an indication part configured to indicate a position on the display part and output a value of residual electric energy thereof, a coordinate detection part configured to detect coordinates of the position indicated by the indication part on the display part, a rendering data production part configured to produce rendering data based on the coordinates of the position indicated by the indication part on the display part, a determination part configured to determine whether or not the value of residual electric energy is less than a threshold value, a rendering data processing part configured to process the rendering data to produce data for notification of electric energy reduction in a case where the determination part determines that the value of residual electric energy is less than the threshold value, and a display control part configured to display the rendering data and the data for notification of electric energy reduction on the display part.

According to another aspect of the present invention, there is provided a display control method, including indicating a position on a display unit by pan indication unit, outputting a value of residual electric energy of the indication unit from the indication unit, detecting coordinates of the position indicated by the indication unit on the display unit, producing rendering data based on the coordinates of the position indicated by the indication unit on the display unit, determining whether or not the value of residual electric energy is less than a threshold value, processing the rendering data to produce data for notification of electric energy reduction when determining that the value of residual electric energy is less than the threshold value, and displaying the rendering data and the data for notification of electric energy reduction on the display unit.

DETAILED DESCRIPTION OF THE PREFERRED EMBODIMENTS

A display control device, a display control system, and an image processing program according to an embodiment of the present invention will be described below, with reference to the accompanying drawings. Here, although an electronic blackboard device is illustratively described as one example of a display control device in the present embodiment, no limitation to such an electronic blackboard device is provided. Although an electronic blackboard system will be described as one example, a display control system may be a system that displays display data stored in a storage as well as a projection system or a display system. Furthermore, it is possible to combine respective embodiments appropriately unless inconsistency is caused in a content thereof.

<A Configuration of an Electronic Blackboard Device>

Figure 1:
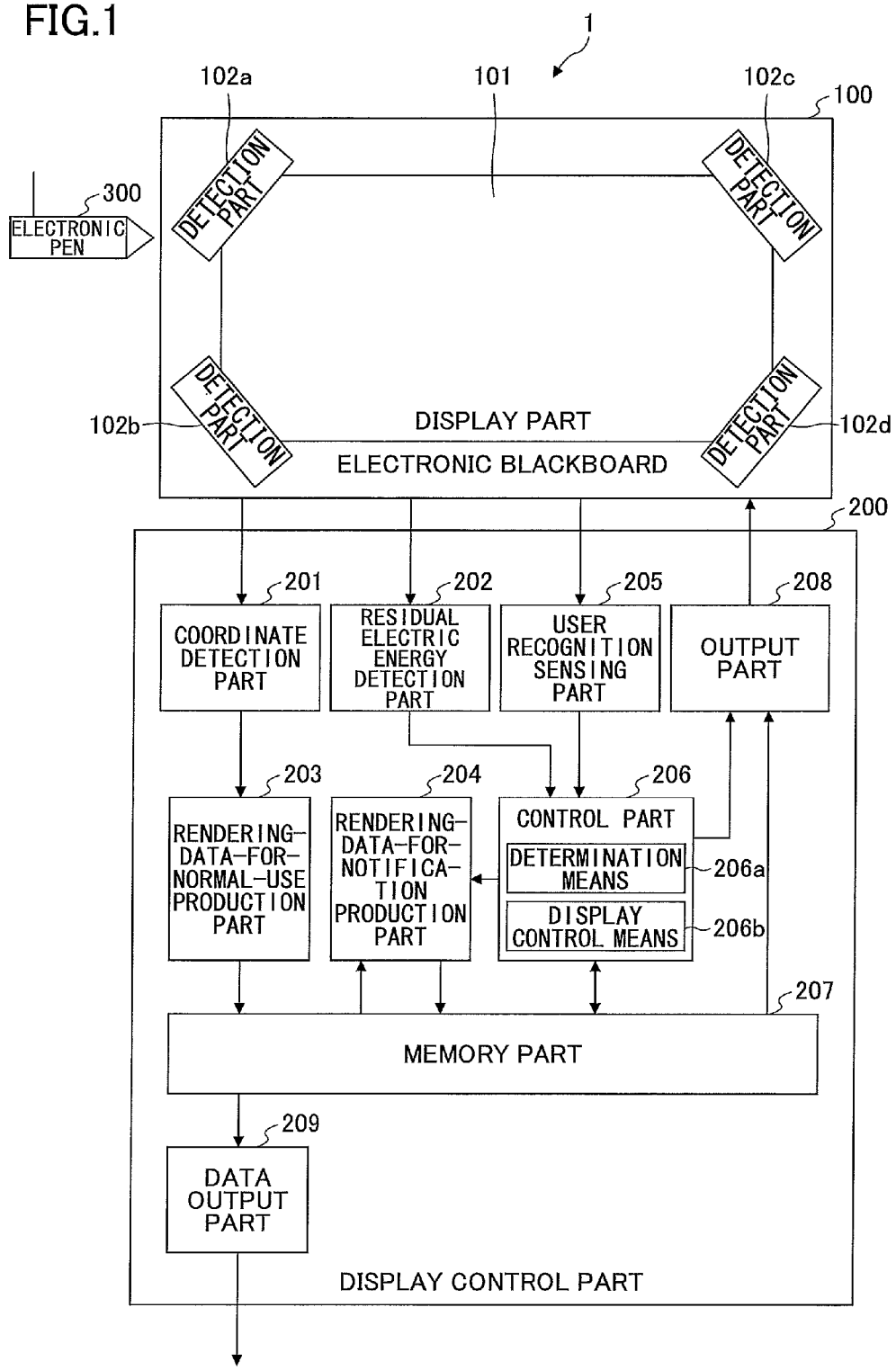
FIG. 1 is a functional block diagram that illustrates an example of a configuration of an electronic blackboard device according to a first embodiment.

FIG. 1 is a functional block diagram that illustrates a configuration example of an electronic blackboard device 1 according to a first embodiment. The electronic blackboard device 1 in the present embodiment has an electronic pen 300 as an indication means, an electronic blackboard 100 that has a display part 101 that displays rendering data from the electronic pen 300, and a display control part 200 that executes a display control for rendering data or the like to be displayed on the display part 101.

The electronic blackboard 100, the display control part 200, and the electronic pen 300 are connected to be capable of communicating information interactively, and the electronic blackboard 100 outputs information transmitted from the electronic pen 300, such as an output signal, an electric energy, or coordinates of an output signal, to the display control part 200 as needed. The display control part 200 is configured to transmit rendering data produced based on an output signal from the electronic pen 300 and coordinates thereof and an electric energy thereof, to the electronic blackboard 100 as needed.

(A Configuration of an Electronic Pen)

Figure 2:
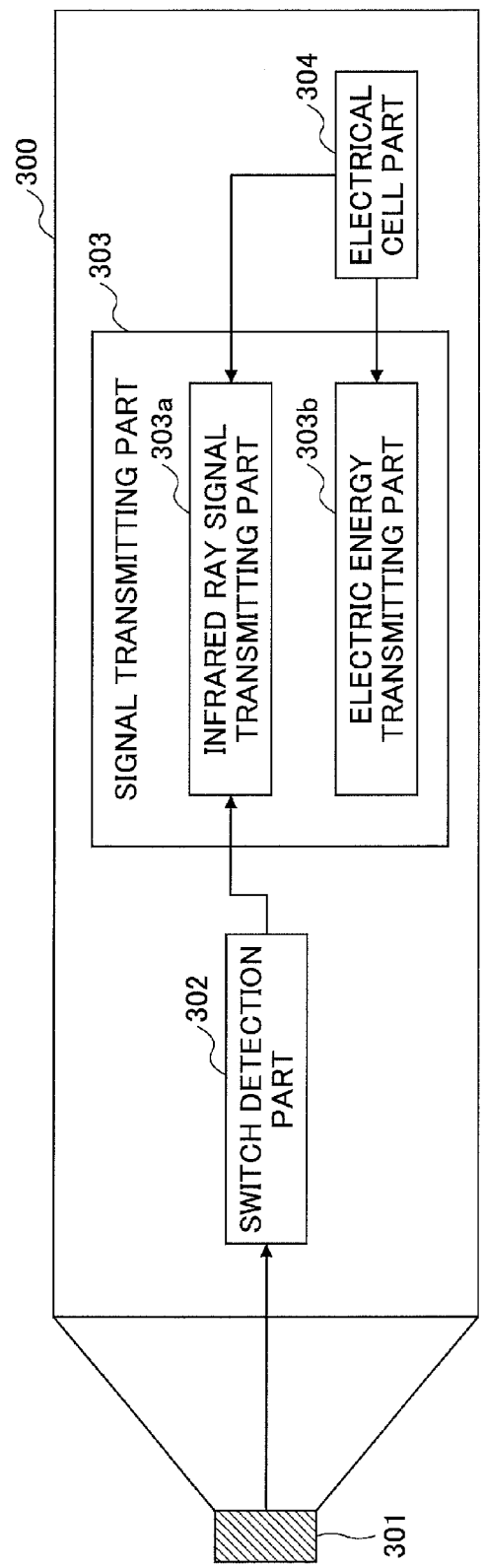
FIG. 2 is a functional block diagram that illustrates an example of a configuration of an electronic pen.

As illustrated in FIG. 2, the electronic pen 300 has a switch part 301, a switch detection part 302, a signal transmission part 303 as a signal output means, and an electrical cell part 304. The signal transmission part 303 has an infrared ray signal transmission part 303a and an electric energy transmission part 303b.

The switch part 301 is arranged at a tip of the pen and the switch detection part 302 detects whether or not the switch part 301 pushes the display part 101. Then, the infrared ray signal transmission part 303a is controlled based on a detected result so that an infrared ray signal is transmitted (light-emitted) during a period of time when the switch part 301 is pushed. The electrical cell part 304 is a widely used battery. The electric energy transmission part 303b has a function of transmitting an electric energy of the electrical cell part 304 as needed, and an electric energy is transmitted to the electronic blackboard 100 by, for example, a near-field wireless communication means such as Bluetooth (registered trademark). It is sufficient for a transmitted electric energy to be an electric signal capable of detecting a residual quantity for a battery. Furthermore, it is also possible to consider a method, for example, in such a manner that the infrared ray signal transmission part 303a transmits a predetermined signal pattern at a time of electric energy reduction to notify of a residual electric energy value without mounting the electric energy transmission part 303b.

(A Configuration of an Electronic Blackboard)

The electronic blackboard 100 has detection parts 102a-102d as coordinate detection means that optically detect a point of the electronic pen 300 (a pen tip) that touches the display part 101. Each detection part 102 detects information of coordinates of a pen tip of the electronic pen 300 based on a signal transmitted from the infrared ray signal transmission part 303a. The detection parts 102a-102d output detected coordinate information to the display control part 200. The illustrated detection parts 102a-102d are arranged at four corners of the display part 101, however, and are not limited thereto.

(A Configuration of a Display Control Part)

The display control part 200 has a coordinate detection part 201, a residual electric energy detection part 202, a rendering-data-for-normal-use production part 203 as a rendering data production means, a rendering-data-for-notification production part 204 as a rendering data processing means, a user recognition sensing part 205, a control part 206 as a determination means and a display control means, a memory part 207 as a storage part, an output part 208, and a data output part 209.

The coordinate detection part 201 is an interface that acquires information of each coordinate of the electronic pen 300 that is provided in each detection part 102. The coordinate detection part 201 outputs information of coordinates of the electronic pen 300 that is acquired from each detection part 102, to the rendering-data-for-normal-use production part 203.

The residual electric energy detection part 202 is an interface that acquires information of an electric energy that is transmitted from the electric energy transmission part 303b of the electronic pen 300 through the electronic blackboard 100. The residual electric energy detection part 202 outputs an acquired electric energy to the control part 206. For acquisition of a residual electric energy value of the electronic pen 300, it is possible to execute the acquisition by being communicated with the electronic blackboard 100 that has acquired information of an electric energy from the electronic pen 300. Of course, the acquisition may be executed by using another communication means. It is sufficient for an acquired electric energy to be an electric signal capable of detecting a residual quantity for a battery.

The rendering-data-for-normal-use production part 203 has a function of producing rendering data based on information of coordinates that is detected by the coordinate detection part 201. This rendering-data-for-normal-use production part 203 is to produce rendering data that are displayed on the display part 101 in accordance with a user's rendering operation by the electronic pen 300 on the display part 101, wherein such production is executed with initially set color, density, size, font, and the like. These rendering data for normal use are produced whenever the coordinate detection part 201 detects information of coordinates. Rendering data produced by this rendering-data-for-normal-use production part 203 are referred to as rendering data for normal use in the present specification. These rendering data for normal use are outputted to the memory part 207.

The rendering-data-for-notification production part 204 has a function of processing the rendering data for normal use produced by the rendering-data-for-normal-use production part 203 based on a predetermined rule to produce rendering data for notification of electric energy reduction that notify a user of such electric energy reduction.

This contributes to a notification means for notifying a user of electric energy reduction in a case where an electric energy for the electronic pen 300 is less than a predetermined quantity. Processing based on a predetermined rule means that processing is executed into a format that displays electric energy reduction, and for example, means that a density, a color, a shape, or the like, of a rendering line that composes rendering data is modified or processed. Furthermore, it is also means that processing of rendering data is changed based on a residual electric energy value as needed.

For such modification or processing, it is preferable to apply, for example, processing that compensates for scratching caused in a case where an amount of residual ink is reduced in an ink-type pen, to a rendering line that composes rendering data. A specific format for displaying electric energy reduction will be described below. Rendering data produced by this rendering-data-for-notification production part 204 are referred to as rendering data for notification in the present specification. In particular, "rendering data for notification of electric energy reduction" will be described in illustrative embodiments. These rendering data for notification are outputted to the memory part 207.

The user recognition sensing part 205 is an interface that senses that a user views rendering data for notification that and are displayed on the display part 101 and notify of electric energy reduction and recognizes electric energy reduction of the electronic pen 300. For example, a sensing configuration may be such that a user pushes a recognition button provided on the electronic blackboard 100 or a sensing method may be such that a recognition button provided on the electronic pen 300 is pushed. Furthermore, a sensing configuration may be such that a particular operation, for example, vibration, or touching a part other than the display part 101 several times, may be applied to the electronic pen 300. In any case, a function is included for sensing that a user recognizes electric energy reduction when some kind of recognition signal is notified of. Therefore, such a function is appropriately modified depending on a kind of recognition signal. It is possible to execute communication of information of a recognition signal transmitted by a user, by a near-field wireless communication means such as Bluetooth as described above.

The control part 206 has a determination means 206a and a display control means 206b, wherein each means is operated by a control program. The determination means 206a has a determination function that calculates a residual electric energy value from an electric energy detected by the residual electric energy detection part 202 and determines a normal state or an electric energy reduction state. This determines based on, for example, whether or not a residual electric energy value is less than a predetermined threshold value (for example, a residual electric energy value is less than 20%), as described below. If a determination is provided in such a manner that a residual electric energy value of the electronic pen 300 that is detected by the residual electric energy detection part 202 is less than a threshold value, rendering data for notification are produced in the rendering-data-for-notification production part 204.

The display control means 206b has a function that executes a control for causing the output part 208 to output suitable rendering data to the display part 101. Furthermore, the display control means 206b has a function that switches to display rendering data for normal use produced by the rendering-data-for-normal-use production part 203 on the display part 101 when the user recognition sensing part 205 described above senses that a user recognizes electric energy reduction. At this time, the display control means 206 reads out in the output part 208, and switches a display into, rendering data for normal use that are stored in the memory part 207.

The memory part 207 is, for example, a readable and writable storage device such as a Random Access Memory (RAM), a Hard Disk Drive (HDD), or an optical disk. This memory part 207 stores, at least, rendering data for normal use produced by the rendering-data-for-normal-use production part 203 and rendering data for notification produced by the rendering-data-for-notification production part 204. Furthermore, it is preferable for the memory part 207 to have a storage area and a function that readably stores a stored rendering data for normal use as data of a meeting or a lesson for preservation when such a meeting or lesson is ended. It is preferable for rendering data for notification to be erased automatically when a user ends use of the electronic blackboard device 1.

The output part 208 has a function that reads out from the memory part 207 and outputs to the display part 101, rendering data for normal use produced by the rendering-data-for-normal-use production part 203 and rendering data for notification produced by the rendering-data-for-notification production part 204, in accordance with a control instruction from the display control means 206b.

The data output part 209 is an interface that is used when rendering data for normal use stored in the memory part 207 are stored or preserved in a storage device such as a Universal Serial Bus (USB) or in a sever through a network.

(A Display Format of Rendering Data for Notification)

Next, a display format of rendering data for notification will be described that is produced by the rendering-data-for-notification production part.

Figure 3A:
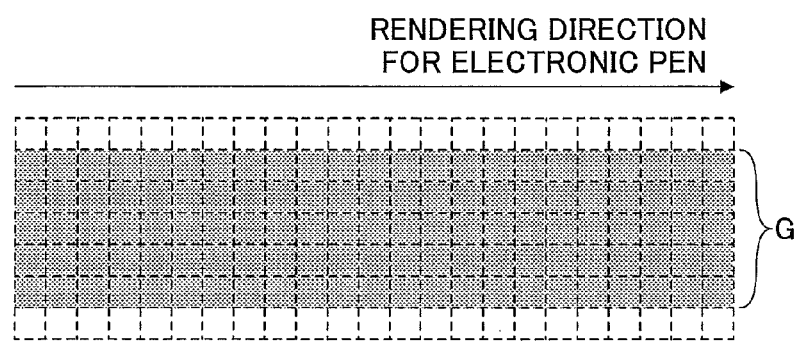
FIG. 3A, FIG. 3B, and FIG. 3C are reference diagrams that illustrate one example of a display format of rendering data.
Figure 3B:
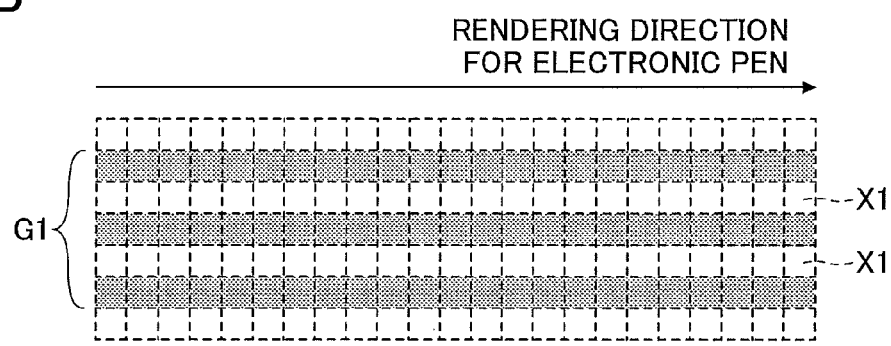
Figure 3C:
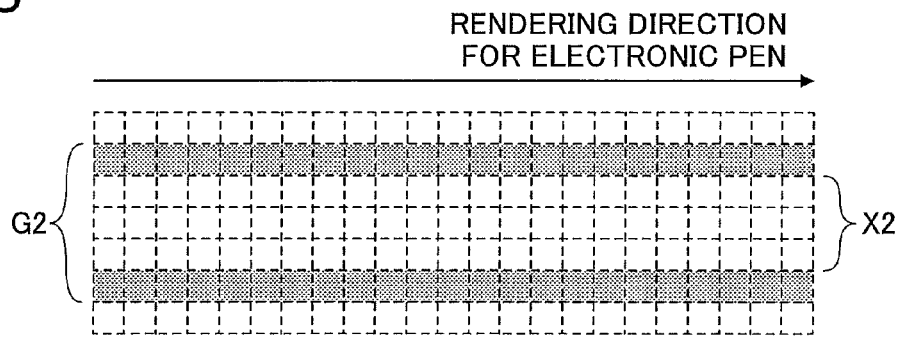

One example of rendering data for notification to notify a user of electric energy reduction is provided as, for example, a display format to be processed as illustrated in FIG. 3A, FIG. 3B, and FIG. 3C. A feature as illustrated in FIG. 3A, FIG. 3B, and FIG. 3C is such that a blank line is formed in a direction parallel to a rendering direction for an electronic pen to express scratching on a character such as an ink character.

FIG. 3A illustrates rendering data for normal use. FIG. 3B illustrates one example of rendering data for notification that have a blank line in a direction parallel to a rendering direction. FIG. 3C illustrates one example of rendering data for notification that have a blank line broader than that of FIG. 3B.

When the rendering-data-for-notification production part 204 forms a continuous output signal from the electronic pen 300 as a rendering line G as illustrated in FIG. 3A, processing is executed to provide a rendering line G1 with a blank line X1 formed in a direction parallel to a rendering direction as illustrated in FIG. 3B, so that rendering data for notification are produced.

Specifically, for example, in a case where a rendering line G at a time of normal use is rendered with 5 dots for rendering in a vertical direction as illustrated in FIG. 3A, a blank line X1 is generated between horizontal lines at 2nd dot and 4th dot. Thus, it is possible to express scratching on an ink character.

Furthermore, a rendering line G2 with a blank line X2 generated in a continuous horizontal line from 2nd dot to 4th dot may be produced to express a greater degree of scratching as illustrated in FIG. 3C.

Therefore, it is possible to form a blank line X in a rendering line so that it is possible to express scratching on an ink character, and it is possible for a user to view and sensorially recognize electric energy reduction of the electronic pen 300 due to such an expression of scratching.

For two patterns as described above, for example, a method is preferable that produces rendering data for normal use that have a rendering line G1 in FIG. 3B in a case where a residual electric energy value is less than 20% of a first threshold value, and produces rendering data for normal use that have a rendering line G2 in FIG. 3C in a case where a residual electric energy value is less than 10% of a second threshold value. Thereby, it is also possible to view and recognize a degree of reduction of a residual electric energy value because such a residual electric energy value corresponds to a degree of ink scratching.

Figure 4A:
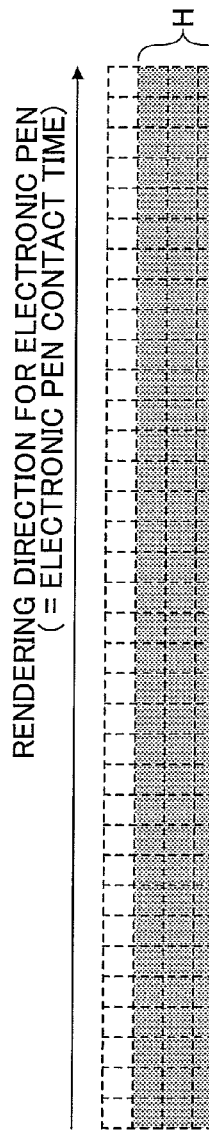
FIG. 4A, FIG. 4B, and FIG. 4C are reference diagrams that illustrate another example of a display format of rendering data.
Figure 4B:
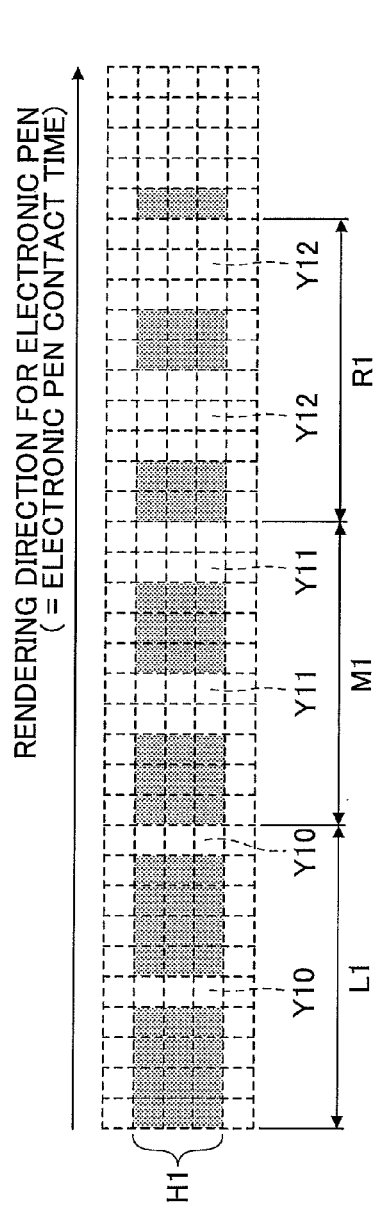
Figure 4C:
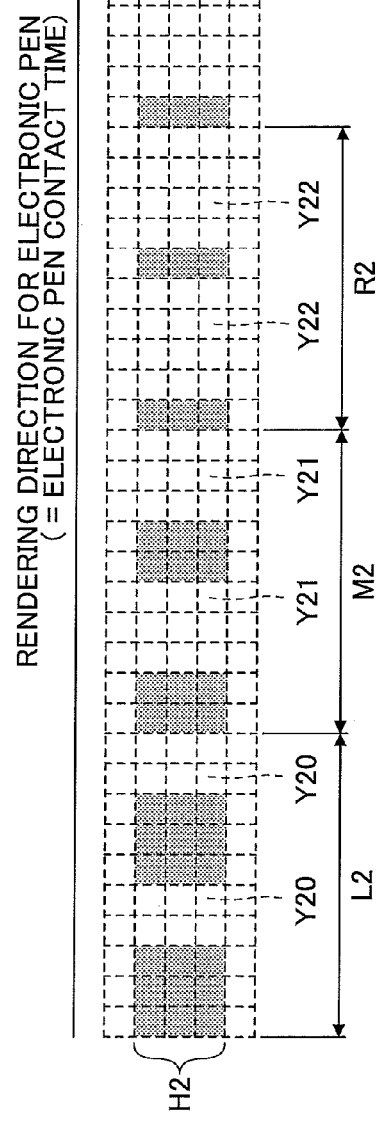

FIG. 4A, FIG. 4B, and FIG. 4C illustrate another display format of rendering data for notification that are produced by the rendering-data-for-notification production part 204.

A feature of FIG. 4A, FIG. 4B, and FIG. 4C is such that a blank line is formed in a direction orthogonal to a rendering direction to express scratching on an ink character.

FIG. 4A illustrates rendering data for normal use. FIG. 4B illustrates one example of rendering data for notification that have a blank line in a direction orthogonal to a rendering direction. FIG. 4C illustrates one example of rendering data for notification that have a blank line broader than that of FIG. 4B.

When the rendering-data-for-notification production part 204 forms a continuous output signal from the electronic pen 300 as a rendering line H as illustrated in FIG. 4A, processing is executed to provide a rendering line H1 with blank lines Y10-Y12 formed in a direction orthogonal to a rendering direction as illustrated in FIG. 4B, so that rendering data for notification are produced. Moreover, it is preferable to change a number Y of blank line(s) stepwise depending on an output time of an output signal of the electronic pen 300. An output time of an output signal is basically a time of contact with the display part 101 of the electronic pen 300. A contact time of an electronic pen will also be described as below.

An upper right direction in the figures is a rendering direction for the electronic pen 300 and a contact time for the electronic pen 300 increases as going to a right. On a produced rendering line H1, a 1-dot blank line Y10 is formed at an interval of 4 dots in a horizontal (rendering) direction at a left side L1 where a contact time for the electronic pen 300 is shorter. At a middle M1 of the figure, a 2-dot blank line Y11 is formed at a rendering interval of 3 dots. At a right side R1 in the figure, a 3-dot blank line Y12 is formed at a rendering interval of 2 dots.

Furthermore, on a rendering line H2 as illustrated in FIG. 4C, a 2-dot blank line Y20 is formed at a rendering interval of 3 dots in a horizontal (rendering) direction at a left side L2 where a contact time for the electronic pen 300 is shorter. At a middle M2 of the figure, a 3-dot blank line Y21 is formed at a rendering interval of 2 dots. At a right side R2 in the figure, a 4-dot blank line Y22 is formed at a rendering interval of 1 dot.

Therefore, as a contact time for an electronic pen is increased, a number Y of a blank line(s) is also increased so that it is possible to express scratching on an ink character more realistically. Thus, a condition is expressed in such a manner that it is possible to execute writing at a certain degree of density at a start of writing (a time of a start of rendering) however scratching is caused gradually, and thereby, it is possible for a user to easily associate residual quantity reduction of an electrical cell with residual quantity reduction of an ink and view and sensorially recognize electric energy reduction of the electronic pen 300.

For two patterns as described above, for example, a method is preferable that produces rendering data for notification that have a rendering line H1 in FIG. 4B in a case where a residual electric energy value is less than 20% of a first threshold value and produces rendering data for notification that have a rendering line H2 in FIG. 4C in a case where a residual electric energy value is less than 10% of a second threshold value. Thereby, it is also possible to view and recognize a degree of reduction of a residual electric energy value at a glance because such a residual electric energy value corresponds to a degree of ink scratching.

Furthermore, for rendering data capable of viewing and recognizing electric energy reduction, it is also preferable to execute processing into a rendering line with a density lower than one that is initially set for rendering data for normal use, in order to produce rendering data for notification, when a continuous output signal from the electronic pen 300 is formed as a rendering line, although illustration thereof has been omitted.

A condition that an ink-type pen causes ink consumption is artificially expressed by reducing a density, so that it is possible for a user to view and recognize electric energy reduction at a glance. This is advantageous for providing a compact device or a reduced process time because a process for processing rendering data is executed more conveniently than rendering data for notification as depicted in FIG. 3A, FIG. 3B, FIG. 3C, FIG. 4A, FIG. 4B, or FIG. 4C.

Furthermore, it is also preferable to stepwise reduce a density of a rendering line depending on an output time of an output signal (a contact time of the electronic pen 300 on the display part 101) so as to recognize ink consumption=electric energy reduction more intuitively.

Moreover, for rendering data capable of viewing and recognizing electric energy reduction, producing rendering data for notification by providing a color different a color that is initially set for rendering data for normal use is also preferably executed, although illustration thereof is also omitted.

Meanwhile, it is also possible to appropriately combine and implement patterns of a display format of rendering data for notification as described above. For example, rendering data for notification may be produced by processing into a rendering line that is provided by a combination of a rendering line with a blank line(s) whose number is changed depending on a contact time for the electronic pen 300 as described above and a rendering line whose density is stepwise changed or reduced depending on such a contact time for the electronic pen 300 as described above.

As described above, the electronic blackboard device 1 according to the present embodiment processes a rendering line that composes rendering data into a format that displays electric energy reduction when a user is notified of electric energy reduction of the electronic pen 300. Therefore, it is possible to prevent a hand-writing area from being disturbed by conventionally displaying an icon or a message for notification of electric energy reduction on a display part. Furthermore, it is also possible to prevent a meeting or a lesson from being temporarily interrupted by an operation that deletes a display icon or a message from a screen or the like.

Furthermore, a display icon that indicates reduction of residual quantity in a notification method that displays an icon or a message on a display screen is meaningless in a case where such an icon is used by a user who does not known a meaning thereof. Moreover, even in a case a residual quantity is notified of by a message, it is meaningless for a user who could not understand a particular language. However, the electronic blackboard device 1 according to the present embodiment applies, to a rendering line, display processing that artificially expresses a scratching state that is caused when an ink-type pen causes ink consumption, so that it is possible for a user to view and recognize electric energy reduction easily in a manner similar to ink consumption.

A First Embodiment

Figure 5:
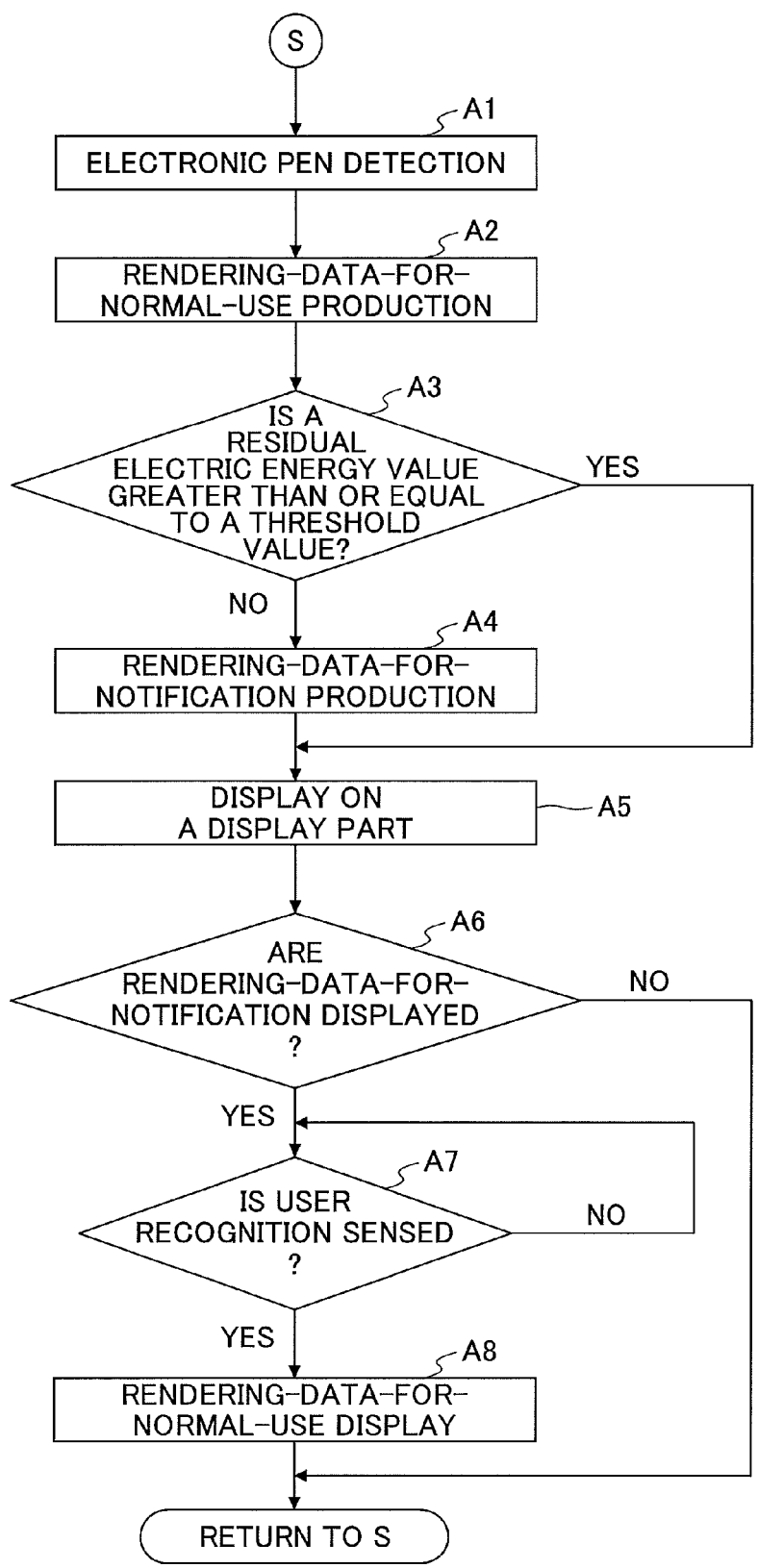
FIG. 5 is a flowchart that illustrates one example of a flow of a rendering data production process for an electronic blackboard device according to a first embodiment.

FIG. 5 is a flowchart that illustrates one example of a rendering date production process flow for the electronic blackboard device 1 in a first embodiment.

First, as a user executes writing (a rendering operation) on the display part 101 by the electronic pen 300, the detection parts 102a-102d detect an infrared ray signal emitted from a pen tip of the electronic pen 300 to detect the electronic pen 300 and acquire, and transmit to the coordination detection part 201 of the display control part 200, coordinate information for the electronic pen 300 (A1).

As the rendering-data-for-normal-use production part 203 acquires coordinate information for the electronic pen 300 that is transmitted to the coordinate detection part 201, rendering data for normal use are produced based on such coordinate information and such produced rendering data for normal use are outputted to and stored in the memory part 207 (A2).

Then, the determination means 206a of the control part 206 acquired a residual electric energy value of the electronic pen 300 from the residual electric energy detection part 202 and determines whether a residual electric energy value is greater than or equal to a threshold value to determine whether an electric energy value of the electronic pen 300 is in a normal state or a residual quantity reduction state (A3). For determination whether a normal state or a residual quantity reduction state is provided, there is provided, for example, a method that determines, as a residual quantity reduction state, a case where a residual electric energy value is less than 15% or a method that determines, as a residual quantity reduction state, a residual electric energy value in a case where a residual operation time of the electronic pen 300 is less than 30 minutes. The present embodiment will be described blow, on a condition that a threshold value for a residual electric energy value is 15%.

If a residual electric energy value is less than 15% (NO) at A3, the control part 206 causes the rendering-data-for-notification production part 204 to read out rendering data for normal use produced by the rendering-data-for-normal-use production part 203 from the memory part 207, processes such read-out rendering data into a format that displays electric energy reduction, and produces rendering data for notification (A4).

Herein, rendering data for notification that are produced by the rendering-data-for-notification production part 204 are produced as, for example, rendering data for notification as illustrated in FIG. 3B or FIG. 4B, as described above. Of course, this is not limited thereto, and rendering data for notification with another display format as described above may be produced.

At A5, the display control means 206*b* of the control part 206 outputs to the display part 101 through the output part 208, and displays on the display part 101, produced rendering data stored in the memory part 207.

If a residual electric energy value of the electronic pen 300 is greater than or equal to 15% (YES) at A3, the control part 206 outputs to the display part 101 through the output part 208, and displays on the display part 101, rendering data for normal use that are rendering data to be displayed and are stored in the memory part 207.

Furthermore, if a residual electric energy value of the electronic pen 300 is less than 15% at A3 and rendering data for notification are produced at A4, the display control means 206*b* outputs to the display part 101 through the output part 208, and displays on the display part 101, rendering data for notification stored in the memory part 207.

Then, at A6, the display control part 206*b* confirms whether rendering data for notification are displayed on the display part 101. If the rendering data for normal use are displayed (NO), a rendering data production process flow is ended and returned to start and each step as described above is repeated until an end of a meeting or a lesson.

If rendering data for notification are displayed (YES) at A6, the control part 206 confirms whether the user recognition sensing part 205 senses that a user recognizes electric energy reduction (A7). A variety of methods that sense user recognition in the user recognition detection part 205 are provided, wherein, for example, a sensing configuration may be provided in such a manner that a user pushes a recognition button provided on the electronic blackboard 100 as described above or a sensing method may be provided to push a recognition button provided on the electronic pen 300.

If a user does not recognize electric energy reduction (NO), rendering data for normal use are continued to be displayed. If the user recognition sensing part 205 senses that a user recognizes electric energy reduction (YES), the display control means 206*b* of the control part 206 switches rendering data for notification that are displayed on the display part 101 into, and displays, rendering data for normal use that are produced by the rendering-data-for-normal-use production part 203 (A8). At this time, the display control means 206*b* reads out into the output part 208, and outputs to the display part 101, rendering data for normal use stored in the memory part 207, so that a display is switched.

Subsequently, a user executes replacement or charging of an electric cell for the electronic pen 300. In a case where a meeting or a lesson continues, returning to start is executed to repeat each step as described above.

As a meeting or a lesson is finished, the memory part 207 retrievably stores stored rendering data for normal use as data for preservation of such a meeting or a lesson. It is preferable for rendering data for notification to be erased automatically when a user ends use of the electronic blackboard device 1. Data for preservation may be configured not to be stored in the memory part 207 but to be stored in another dedicated storage medium.

Therefore, it is possible for the electronic blackboard device 1 according to the first embodiment to display rendering data processed into a format that displays electric energy reduction, and thereby, to provide a user with notification of electric energy reduction that is understandable at a glance, in a case where an electric energy of the electronic pen 300 is less than a predetermined threshold value during a meeting or a lesson. An icon or a message for electric energy reduction in a conventional personal computer is not displayed to disturb a hand-writing area of a display screen or interrupt a meeting or a lesson.

In particular, a rendering line in processed rendering data for notification is such that display processing is applied to artificially express a scratching state in such a manner that ink consumption is caused in an ink-type pen, and hence, it is possible to notify a user of residual quantity reduction of an electronic pen in a display format in such a manner that it is possible to view and sensorially recognize ink consumption or electric energy reduction.

Furthermore, it is possible to continue a meeting or a lesson comfortably due to immediate switching into a display of rendering data for normal use in a case where a user recognizes electric energy reduction of an electronic pen.

A Second Embodiment

Figure 6:
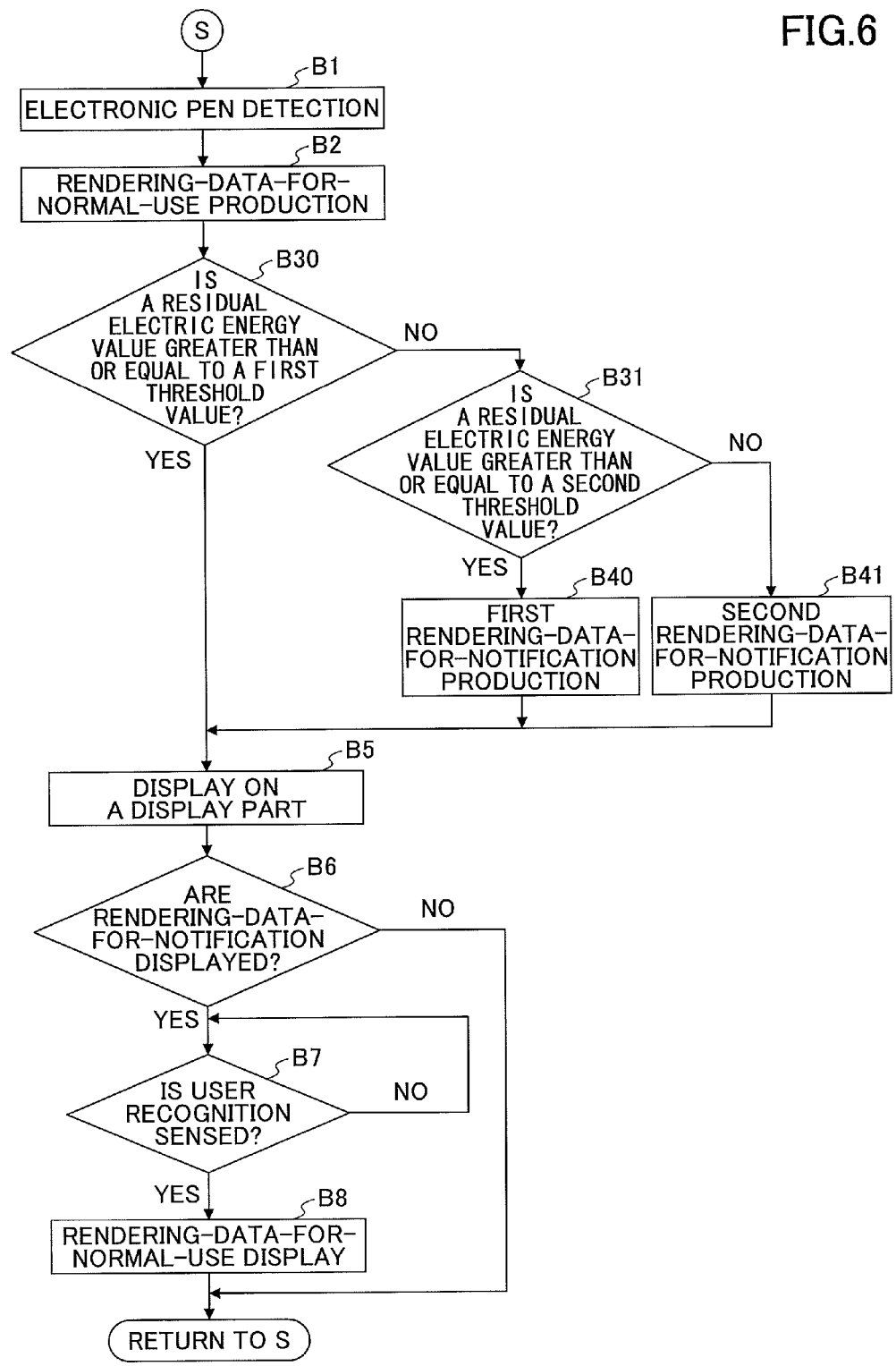
FIG. 6 is a flowchart that illustrates one example of a flow of a rendering data production process for an electronic blackboard device according to a second embodiment.

FIG. 6 is a flowchart that illustrates one example of a rendering data production process flow of the electronic blackboard device 1 according to a second embodiment.

Because Processes at B1-B2 and B5-B8 illustrated in FIG. 6 are similar to processes at A1-A2 and A5-A8 illustrated in FIG. 5 as described above, specific descriptions thereof will be omitted herein and only a difference therebetween will be described.

An essence of the difference is that a plurality of threshold values are provided for a residual electric energy value and rendering data for notification are produced that correspond to the plurality of threshold values. Such a matter will be described below.

At B30, the determination means 206*a* of the control part 206 determines whether a residual electric energy value is greater than or equal to a first threshold value. For a first threshold value, there is provided, for example, a method that determines a residual quantity reduction state in a case where a residual electric energy value is less than 20% or a method that determines a residual quantity reduction state by a residual electric energy value in a case where a residual operating time of the electronic pen 300 is less than 40 minutes. The present embodiment will be described below, while such a threshold value is 20%.

If a residual electric energy value of the electronic pen 300 is greater than or equal to 20% (YES) at B30, the display control means 206*b* of the control part 206 outputs to the display part 101 through the output part 208, and displays on the display part 101, rendering data for normal use stored in the memory part 207 (B5). Such a matter is identical to A5 in FIG. 5.

If a residual electric energy value of the electronic pen 300 is less than 20% (NO) at B30, the determination means 206*a* of the control part 206 further confirms whether a residual electric energy value is greater than or equal to a second threshold value (B31). A second threshold value is less than a first threshold value and is a value that indicates that electric energy reduction more than that is risky. For example, 10% is provided herein.

If a residual electric energy value of the electronic pen 300 is greater than or equal to 10% (less than 20% and greater than or equal to 10%) (YES) at B31, the determination means 206a of the control part 206 produces first rendering data for notification in the rendering-data-for-notification production part 204 (B40). First rendering data for notification are rendering data with a display processed in such a manner that, for example, a scratching state of a rendering line is more mild than that in FIG. 3C or FIG. 4C, as illustrated in FIG. 3B or FIG. 4B. Herein, it is more preferable for a rendering line to provide a display in such a manner that a degree of scratching (a width and a number of a blank line(s) X or a number of sequential blank lines Y) increases as increasing a contact time of an electronic pen on the display part 101. Of course, no limitation of the illustrated examples is provided, and it is also possible to implement another display format as long as processing provides a mild scratching state.

If a residual electric energy value of the electronic pen 300 is less than 10% (NO) at B31, the determination means 206a of the control part 206 produces second rendering data for notification in the rendering-data-for-notification production part 204 (B41).

Second rendering data for notification are rendering data with a display processed in such a manner that, for example, a scratching state of a rendering line is severer than that in FIG. 3B or FIG. 4B, as illustrated in FIG. 3C or FIG. 4C. Herein, it is more preferable for a rendering line to provide a display in such a manner that a degree of scratching (a width and a number of a blank line(s) X or a number of sequential blank lines Y) increases as increasing a contact time of an electronic pen on the display part 101. Of course, no limitation of the illustrated examples is provided, and it is also possible to implement another display format as long as processing provides a severe (strongly) scratching state.

As first or second rendering data for notification are produced at B40 or B41 described above and stored in the memory part 207, the display control means 206b of the control part 206 outputs to the display part 101 through the output part 208, and displays on the display part 101, first or second rendering data for notification at B5. Meanwhile, processes at B6-B8 are those described for A6-A8 in FIG. 5.

Meanwhile, although FIG. 6 illustrates one example that produces and displays rendering data for notification in view of two threshold values, no limitation thereto is provided and two or more threshold values may be set for implementation.

As described above, the electronic blackboard device 1 according to the second embodiment is configured to produce first rendering data for notification in a case where a residual electric energy value of the electronic pen 300 is less than a first threshold value, and produce and notify of second rendering data for notification processed into a display format with electric energy reduction severer than that of first rendering data for notification in a case where a residual electric energy value is less than a second threshold value. Thus, rendering data is changed depending on a residual electric energy value, and thereby, it is possible for a user to view and recognize a degree of reduction of a residual electric energy value of an electronic pen at a glance. Furthermore, it is possible for anybody to recognize electric energy reduction sensorially, because rendering data for notification express a degree of scratching in such a manner that a residual quantity of an ink-type pen is reduced gradually.

A Third Embodiment

It is possible to arbitrarily change a sequence of processes, specific names, information that includes a variety of data or parameters or the like, as illustrated in the specification or drawings, unless otherwise indicated particularly. Furthermore, each component of each illustrated device is functionally conceptual and is not necessarily required to be physically constructed as illustrated in the figure(s). That is, a specific embodiment for separation or integration of respective devices is not limited to one illustrated in the figure(s), and it is possible to functionally or physically separate or integrate an entirety or a part thereof at an arbitrary unit, depending on each kind of load, usage, or the like. That is, the electronic blackboard device 1 (display control device) illustrated in the embodiment(s) described above may be configured to be incorporated in a variety of systems depending on an application or object thereof, or it is possible to implement an electronic blackboard system (display control system) with respective separated or integrated functional parts of the electronic blackboard device 1.

<A Program>

Furthermore, an image processing program that is executed in the rendering-data-for-notification production part 204 of the display control part 200, as one aspect, is recorded in or provided by a computer-readable storage medium such as a CD-ROM, a flexible disk (FD), a CD-R, or a DVD, as a file with an installable format or an executable format. Furthermore, an image processing program that is executed by the rendering-data-for-notification production part 204 may be configured to be stored in a computer connected to a network such an internet and downloaded and provided through such a network. Furthermore, an image processing program that is executed by the rendering-data-for-notification production part 204 may be configured to be provided or distributed through a network such as an internet. Furthermore, an image processing program may be preliminarily incorporated into and provided by a ROM or the like.

Furthermore, it is possible to read out from a storage medium and execute on a processor (CPU) an image processing program as described above.

Some embodiments of the present invention have been described above in detail by using the drawings. Here, the above descriptions do not limit the scope of the embodiments but are provided to understand the embodiments. Furthermore, the multiple embodiments described above are not exclusive with respect to one another. Therefore, some combinations of respective components of different embodiments are also intended unless inconsistency is caused, and it is possible to execute a variety of alterations and/or modifications within the scope of the technical essence of the disclosure recited in the claims.

APPENDIX

An Illustrative Embodiment(s) of a Display Control Device, a Display Control System, and an Image Processing Program At least one illustrative embodiment of the present invention may relate to at least one of a display control device, a display control system, and an image processing program.

An object of at least one illustrative embodiment of the present invention may be to provide a display control device that notifies of reduction of a residual quantity for an electronic pen without disturbing a hand writing area on a display screen while a problem(s) as described above is/are taken into consideration.

At least one illustrative embodiment of the present invention may be a display control device that has an indication means that has a signal output means, a coordinate detection means that detects coordinates of a tip of the indication means, a rendering data production means that produces rendering data based on the coordinates detected by the coordinate detection means, and a display means that displays the produced rendering data thereon, wherein the display control device has a determination means that determines whether or not a residual electric energy value received from the indication means is less than a threshold value, a rendering data processing means that processes the rendering data produced by the rendering data production means based on a predetermined rule to produce rendering data for notification of electric energy reduction in a case where the determination means determines that the residual electric energy value is less than the threshold value, and a display control means that displays on the display part the rendering data for notification of electric energy reduction produced by the rendering data processing means, while a problem(s) as described above is/are taken into consideration.

Illustrative Embodiment (1) is a display control device that has an indication means that has a signal output means, a coordinate detection means that detects coordinates of a tip of the indication means, a rendering data production means that produces rendering data based on the coordinates detected by the coordinate detection means, and a display part that displays the produced rendering data thereon, wherein the display control device is characterized by having a determination means that determines whether or not a residual electric energy value received from the indication means is less than a threshold value, a rendering data processing means that processes the rendering data produced by the rendering data production means based on a predetermined rule to produce rendering data for notification of electric energy reduction in a case where the determination means determines that the residual electric energy value is less than the threshold value, and a display control means that displays on the display part the rendering data for notification of electric energy reduction produced by the rendering data processing means.

Illustrative Embodiment (2) is the display control device as described in Illustrative Embodiment (1), characterized in that the rendering data processing means processes a continuous output signal from the indication means into a rendering line with a blank line(s) formed in a direction parallel to a rendering direction to produce the rendering data for notification of electric energy reduction when the rendering line is formed.

Illustrative Embodiment (3) is the display control device as described in Illustrative Embodiment (1), characterized in that the rendering data processing means processes a continuous output signal from the indication means into a rendering line with a blank line(s) formed in a direction orthogonal to a rendering direction to produce the rendering data for notification of electric energy reduction when the rendering line is formed.

Illustrative Embodiment (4) is the display control device as described in Illustrative Embodiment (1), characterized in that the rendering data processing means processes a continuous output signal from the indication means into a rendering line with a density less than that of rendering data before processing to produce the rendering data for notification of electric energy reduction when the rendering line is formed.

Illustrative Embodiment (5) is the display control device as described in Illustrative Embodiment (3), characterized in that a number of the blank line(s) formed on the rendering line in the orthogonal direction is step-wise changed depending on an output time of the output signal.

Illustrative Embodiment (6) is the display control device as described in any one of Illustrative Embodiments (2) to (5), characterized in that a density of the rendering line is step-wise changed depending on an output time of the output signal.

Illustrative Embodiment (7) is the display control device as described in Illustrative Embodiment (1), characterized in that the rendering data processing means processes a color into that different from a color of rendering data before processing to produce the rendering data for notification of electric energy reduction.

Illustrative Embodiment (8) is the display control device as described in any one of Illustrative Embodiments (1) to (7), characterized by being provided with a user recognition sensing part that senses that a user recognizes electric energy reduction of the indication means, wherein rendering data before processing are displayed on the display part when the user recognition sensing part senses that a user recognizes electric energy reduction.

Illustrative Embodiment (9) is the display control device as described in any one of Illustrative Embodiments (1) to (8), characterized by having a storage part that stores as data for preservation the rendering data produced by the rendering data production means.

Illustrative Embodiment (10) is a display control system that has at least an indication means that has a signal output means and a display part that displays rendering data due to the indication means, wherein the display control system is characterized by having a coordinate detection means that detects coordinates of a tip of the indication means, a rendering data production means that produces rendering data based on the coordinates detected by the coordinate detection means, a determination means that determines whether or not a residual electric energy value received from the indication means is less than a threshold value, a rendering data processing means that processes the rendering data produced by the rendering data production means based on a predetermined rule to produce rendering data for notification of electric energy reduction in a case where the determination means determines that the residual electric energy value is less than the threshold value, and a display control means that displays on the display part the rendering data for notification of electric energy reduction produced by the rendering data processing means.

Illustrative Embodiment (11) is the display control system as described in Illustrative Embodiment (10), characterized in that the rendering data processing means processes a continuous output signal from the indication means into a rendering line with a blank line(s) formed in a direction parallel to a rendering direction to produce the rendering data for notification of electric energy reduction when the rendering line is formed.

Illustrative Embodiment (12) is the display control system as described in Illustrative Embodiment (10), characterized in that the rendering data processing means processes a continuous output signal from the indication means into a rendering line with a blank line(s) formed in a direction orthogonal to a rendering direction to produce the rendering data for notification of electric energy reduction when the rendering line is formed.

Illustrative Embodiment (13) is the display control system as described in Illustrative Embodiment (10), characterized in that the rendering data processing means processes a continuous output signal from the indication means into a rendering line with a density less than that of rendering data before processing to produce the rendering data for notification of electric energy reduction when the rendering line is formed.

Illustrative Embodiment (14) is the display control system as described in Illustrative Embodiment (12), characterized in that a number of the blank line(s) formed on the rendering line in the orthogonal direction is step-wise changed depending on an output time of the output signal.

Illustrative Embodiment (15) is the display control system as described in any one of Illustrative Embodiments (10) to (14), characterized in that a density of the rendering line is step-wise changed depending on an output time of the output signal.

Illustrative Embodiment (16) is the display control system as described in Illustrative Embodiment (10), characterized in that the rendering data processing means processes a color into that different from a color of rendering data before processing to produce the rendering data for notification of electric energy reduction.

Illustrative Embodiment (17) is the display control system as described in any one of Illustrative Embodiments (10) to (16), characterized by being provided with a user recognition sensing part that senses that a user recognizes electric energy reduction of the indication means, wherein rendering data before processing are displayed on the display part when the user recognition sensing part senses that a user recognizes electric energy reduction.

Illustrative Embodiment (18) is the display control system as described in any one of Illustrative Embodiments (10) to (17), characterized by having a storage part that stores as data for preservation the rendering data produced by the rendering data production means.

Illustrative Embodiment (19) is an image processing program for the display control device as described in any one of Illustrative Embodiments (1) to (9), wherein the image processing program is characterized by causing a computer to execute a rendering data production step that produces rendering data based on coordinates of a tip of an indication means, and a rendering data processing step that processes a rendering line that composes the rendering data produced by the rendering data production step into a rendering line with a blank line(s) formed in a direction parallel to a rendering direction to produce rendering data for notification of electric energy reduction in a case where a residual electric energy value of the indication means is determined to be less than a threshold value.

Illustrative Embodiment (20) is an image processing program for the display control device as described in any one of Illustrative Embodiments (1) to (9), wherein the image processing program is characterized by causing a computer to execute a rendering data production step that produces rendering data based on coordinates of a tip of an indication means, and a rendering data processing step that processes a rendering line that composes the rendering data produced by the rendering data production step into a rendering line with a blank line(s) formed in a direction orthogonal to a rendering direction to produce rendering data for notification of electric energy reduction in a case where a residual electric energy value of the indication means is determined to be less than a threshold value.

According to at least one illustrative embodiment of the present invention, it may be possible to provide a display control device that notifies of reduction of a residual quantity for an electronic pen without disturbing a hand writing area on a display screen.

Although the illustrative embodiment(s) and specific example(s) of the present invention have been described with reference to the accompanying drawing(s), the present invention is not limited to any of the illustrative embodiment(s) and specific example(s), and the illustrative embodiment(s) and specific example(s) may be altered, modified, or combined without departing from the scope of the present invention.

The present application is based on and claims the benefit of priority to Japanese Patent Application No. 2013-240953 filed on Nov. 21, 2013, the entire content(s) of which is/are herein incorporated by reference.

What is claimed is:

1. A display control device, comprising:
a display part;
an indication part configured to indicate a position on the display part and output a value of residual electric energy thereof;
a coordinate detection part configured to detect coordinates of the position indicated by the indication part on the display part;
a rendering data production part configured to produce rendering data based on the coordinates of the position indicated by the indication part on the display part;
a determination part configured to determine whether or not the value of residual electric energy is less than a threshold value;
a rendering data processing part configured to process the rendering data to produce data for notification of electric energy reduction in a case where the determination part determines that the value of residual electric energy is less than the threshold value; and
a display control part configured to display the rendering data and the data for notification of electric energy reduction on the display part,
a user detection recognition part configured to detect a predetermined user action that indicates that the user recognizes the electric energy reduction, and
a storage part configured to store the rendering data therein,
wherein the rendering data processing part is further configured to automatically erase the data for the notification of the electric energy reduction when the display control device is turned off, and
wherein the rendering data processing part is configured to produce the rendering data in such a manner that the rendering data include data of a rendering line and further configured to change the data for notification of electric energy reduction in a step-wise manner with respect to a contact time of the indication part on the display part.

2. The display control device as claimed in claim 1, wherein the rendering data production part is further configured to produce the rendering data in such a manner that the rendering data include data of a rendering line, and the rendering data processing part is further configured to produce the data for notification of electric energy reduction in such a manner that the data for notification of electric energy reduction include data of a part of the rendering line and one or more blank lines in a direction parallel to a direction of the rendering line.

3. The display control device as claimed in claim 1, wherein the rendering data production part is further configured to produce the rendering data in such a manner that the rendering data include data of a rendering line, and the rendering data processing part is further configured to produce the data for notification of electric energy reduction in such a manner that the data for notification of electric energy reduction include data of a part of the rendering line and one or more blank lines in a direction orthogonal to a direction of the rendering line.

4. The display control device as claimed in claim 1, wherein the rendering data production part is further configured to produce the rendering data in such a manner that the rendering data include data of a rendering line, and the rendering data processing part is further configured to produce the data for notification of electric energy reduction in such a manner that the data for notification of electric energy reduction include data of a line with a line density less than a density of the rendering line.

5. The display control device as claimed in claim 1, wherein the rendering data production part is further configured to produce the rendering data in such a manner that the rendering data include data of a rendering line, and the rendering data processing part is further configured to produce the data for notification of electric energy reduction in such a manner that the data for notification of electric energy reduction include data of a line with a color different from a color of the rendering line.

6. The display control device as claimed in claim 1, further comprising:
   a user recognition sensing part configured to sense that a user recognizes electric energy reduction of the indication part,
   wherein the display control part is further configured to display the rendering data on the display part in a case where the user recognition sensing part senses that a user recognizes electric energy reduction of the indication part.

7. A display control method by using a display control device, comprising:
   indicating a position on a display unit by an indication unit;
   outputting a value of residual electric energy of the indication unit from the indication unit;
   detecting coordinates of the position indicated by the indication unit on the display unit;
   producing rendering data based on the coordinates of the position indicated by the indication unit on the display unit;
   determining whether or not the value of residual electric energy is less than a threshold value;
   processing the rendering data to produce data for notification of electric energy reduction when determining that the value of residual electric energy is less than the threshold value; and
   displaying the rendering data and the data for notification of electric energy reduction on the display unit,
   detecting a predetermined user action that indicates that the user recognizes the electric energy reduction,
   storing the rendering data in a storing part provided to the display control device, and
   automatically erasing the data for the notification of the electric energy reduction when the display control device is turned off,
   wherein the method further comprises processing the rendering data in such a manner that the rendering data include data of a rendering line and changing the data for notification of electric energy reduction in a step-wise manner with respect to a contact time of the indication part on the display part.

8. The display control method as claimed in claim 7, wherein the rendering data are produced to include data of a rendering line, and the data for notification of electric energy reduction are produced to include data of a part of the rendering line and one or more blank lines in a direction parallel to a direction of the rendering line.

9. The display control method as claimed in claim 7, wherein the rendering data are produced to include data of a rendering line, and the data for notification of electric energy reduction are produced to include data of a part of the rendering line and one or more blank lines in a direction orthogonal to a direction of the rendering line.

10. The display control method as claimed in claim 7, wherein the rendering data are produced to include data of a rendering line, and the data for notification of electric energy reduction are produced to include data of a line with a line density less than a density of the rendering line.

11. The display control method as claimed in claim 7, wherein the rendering data are produced to include data of a rendering line, and the data for notification of electric energy reduction are produced to include data of a line with a color different from a color of the rendering line.

12. The display control method as claimed in claim 7, further comprising:
   sensing that a user for the displaying unit and the indication unit recognizes electric energy reduction of the indication unit,
   wherein the rendering data are displayed on the display unit when sensing that a user for the displaying unit and the indication unit recognizes electric energy reduction of the indication unit.

13. The display control method as claimed in claim 7, further comprising:
   storing the rendering data.

* * * * *